United States Patent
Jadhav et al.

(10) Patent No.: US 11,363,149 B2
(45) Date of Patent: Jun. 14, 2022

(54) METHOD AND APPARATUS FOR PROVIDING A COMMUNICATION SERVICE IN A COMMUNICATION NETWORK USING PREALLOCATED USAGE UNITS

(71) Applicant: Telefonaktiebolaget LM Ericsson (publ), Stockholm (SE)

(72) Inventors: Kiran Jadhav, Karlskrona (SE); Ove Karlsson, Emmaboda (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 17/276,845

(22) PCT Filed: Sep. 18, 2018

(86) PCT No.: PCT/SE2018/050952
§ 371 (c)(1),
(2) Date: Mar. 17, 2021

(87) PCT Pub. No.: WO2020/060454
PCT Pub. Date: Mar. 26, 2020

(65) Prior Publication Data
US 2021/0385335 A1    Dec. 9, 2021

(51) Int. Cl.
*H04M 15/00* (2006.01)
*H04W 4/24* (2018.01)

(52) U.S. Cl.
CPC ......... *H04M 15/785* (2013.01); *H04M 15/64* (2013.01); *H04M 15/66* (2013.01); *H04M 15/854* (2013.01); *H04W 4/24* (2013.01)

(58) Field of Classification Search
CPC .... H04M 15/64; H04M 15/66; H04M 15/854; H04M 15/785; H04W 4/24
See application file for complete search history.

(56) References Cited

U.S. PATENT DOCUMENTS

| 8,897,749 B1 | 11/2014 | Ephraim et al. |
| 9,066,275 B2 * | 6/2015 | Yan .................. H04W 48/02 |

(Continued)

FOREIGN PATENT DOCUMENTS

| CN | 1859534 B | 6/2012 |
| CN | 101203036 B | 9/2012 |

(Continued)

OTHER PUBLICATIONS

3GPP, "3GPP TS 32.225 V5.11.0", 3rd Generation Partnership Project; Technical Specification Group Service and System Aspects; Telecommunication management; Charging management; Charging data description for the IP Multimedia Subsystem (IMS) (Release 5), Mar. 2006, 1-63.

(Continued)

*Primary Examiner* — Pakee Fang
(74) *Attorney, Agent, or Firm* — Murphy, Bilak & Homiller, PLLC

(57) ABSTRACT

A charging trigger function (CTF 40) in a communication network (30) advantageously uses pre-allocated usage units to authorize the use of a communication service by a user, when a pre-allocated usage unit is available with respect to the involved communication service and user. A pre-allocation function (PAF 42) provides the one or more pre-allocated usage units directly to the CTF (40) or indirectly via an online charging function (OCF 44). The pre-allocated usage units are determined, for example, according to predicted usage information, user account information, and configured rules. A usage prediction function (UPF 52) in the network (30) uses user-related information, such as historical usage data or other activity by the user, to generate the predicted usage information. Among its other advantages, authorizing the use of the communication service based on pre-allocated usage units obviates or reduces the (Continued)

need for usage authorization signaling going between the CTF and OCF.

16 Claims, 8 Drawing Sheets

(56) References Cited

U.S. PATENT DOCUMENTS

| | | | |
|---|---|---|---|
| 9,900,444 B1* | 2/2018 | Seetharaman | H04M 15/8044 |
| 10,044,879 B1 | 8/2018 | Oded | |
| 10,547,497 B1* | 1/2020 | Mostafa | H04L 43/0876 |
| 11,146,691 B2* | 10/2021 | Li | H04L 43/0876 |
| 2006/0034438 A1 | 2/2006 | O'Neill | |
| 2006/0114932 A1 | 6/2006 | Cai et al. | |
| 2012/0198058 A1 | 8/2012 | Pogorelik et al. | |
| 2015/0271342 A1* | 9/2015 | Gupta | H04M 15/60 455/406 |
| 2016/0127565 A1 | 5/2016 | Sharma et al. | |
| 2018/0097644 A1 | 4/2018 | Sharma et al. | |

FOREIGN PATENT DOCUMENTS

| | | |
|---|---|---|
| EP | 2874347 A1 | 5/2015 |
| RU | 2452134 C1 | 5/2012 |
| RU | 2481639 C2 | 5/2013 |
| WO | 2009131614 A1 | 10/2009 |
| WO | 2010062266 A1 | 6/2010 |
| WO | 2013100829 A1 | 7/2013 |
| WO | 2016151598 A1 | 9/2016 |

OTHER PUBLICATIONS

3GPP, "3GPP TS 32.240 V15.2.0", 3rd Generation Partnership Project; Technical Specification Group Services and System Aspects; Telecommunication management; Charging management; Charging architecture and principles (Release 15), Jun. 2018, 1-59.

3GPP, "3GPP TS 32.296 V15.0.0", 3rd Generation Partnership Project; Technical Specification Group Services and System Aspects; Telecommunication management; Charging management; Online Charging System (OCS): Applications and interfaces (Release 15), Jun. 2018, 1-94.

3GPP, "3GPP TS 32.299 V15.3.0", 3rd Generation Partnership Project; Technical Specification Group Services and System Aspects; Telecommunication management; Charging management; Diameter charging applications (Release 15), Jun. 2018, 1-204.

Author Unknown, "Transmission Control Protocol", Darpa Internet Program Protocol Specification, Information Sciences Institute, RFC 793, Sep. 1981, 1-89.

Calhoun, P., et al., "Diameter Base Protocol", Internet Engineering Task Force, Network Working Group, Request for Comments: 3588, Category: Standards Track, Sep. 2003, pp. 1-147.

Stewart, E., "Stream Control Transmission Protocol", Internet Engineering Task Force, Network Working Group, Request for Comments 4960, Sep. 2007, 1-152.

* cited by examiner

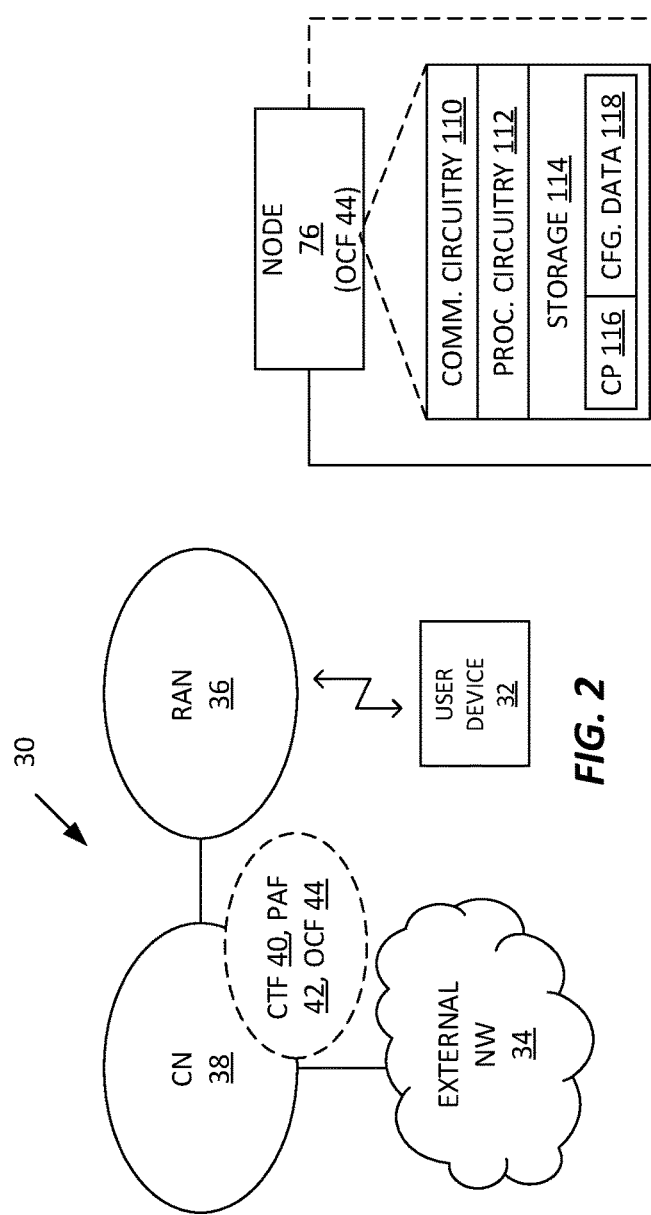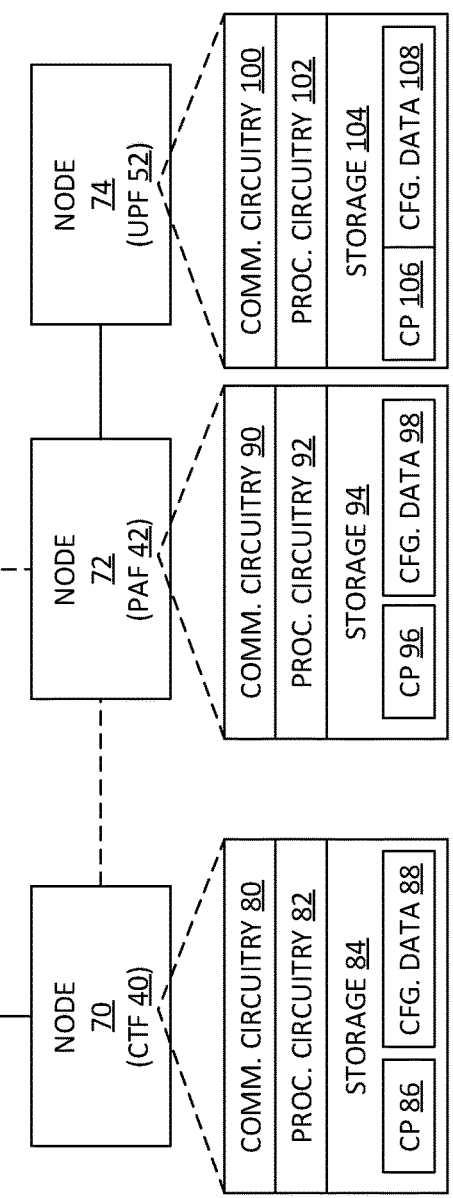
FIG. 2
FIG. 5

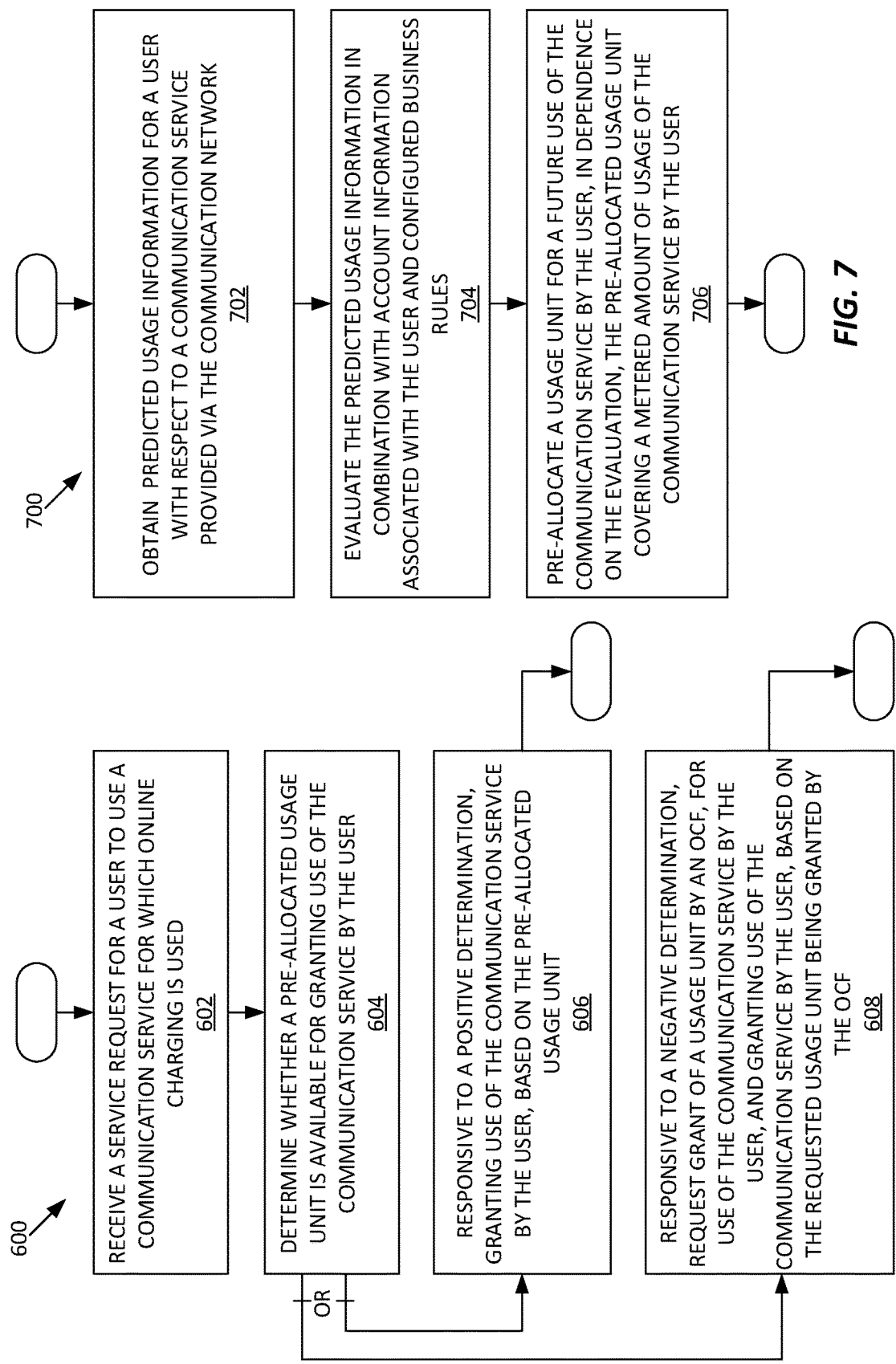

Pre-Allocated-Service-Units ::= < AVP Header: xxx > (NEW)

[ Predicted-Service-Units ] (NEW)

*[ Service-Identifier ]

[ Rating-Group ]

[ Service-Unit-Pool-Reference ] (NEW)

[ Validity-Time ]

*[ AVP ]

FIG. 10

Pre-Allocated-Service-Usage-Report ::= < AVP Header: xxx > (NEW)

[ Predicted-Service-Unit ] (NEW)

*[ Used-Service-Unit ]

[ Usage-Timestamp ] (NEW)

[ Tariff-Change-Usage ]

*[ Service-Identifier ]

[ Rating-Group ]

*[ Service-Unit-Pool-Reference ] (NEW)

*[ AVP ]

FIG. 11

METHOD AND APPARATUS FOR PROVIDING A COMMUNICATION SERVICE IN A COMMUNICATION NETWORK USING PREALLOCATED USAGE UNITS

TECHNICAL FIELD

The present invention relates to providing a communication service to a user of a communication network and specifically relates to the use of pre-allocated usage units.

BACKGROUND

Online charging of the communication service involves the real-time determination of whether or to what extent a subscriber—also referred to as a user—is permitted to access a communication service provided through the communication network. For example, to authorize a communication event or the establishment of the communication session, a certain amount of usage "credit" is secured against an account associated with the user and the service in question is provided to an extent covered by that credit. Further or continued usage of the service requires additional authorizations. See TS 32.240 and see TS 32.296 and TS 32.299.

Usage credit may be represented in terms of discrete "service units", which may also be referred to as "usage units". Each usage unit covers a certain communication service event or a certain amount of usage of a communication service, depending upon the manner in which the communication service is metered for usage and charging.

FIG. 1 illustrates a known arrangement where a communication network—not explicitly shown—includes nodes implementing various functions associated with charging for the use of communication services by one or more user devices 12. Example functions include a charging trigger function (CTF) 14, an online charging function (OCF) 16, a charging data function (CDF) 18, and a charging gateway function 20 that interfaces with a billing domain 22.

In an example approach to granting access to a communication service by a user device 12—a user—the CTF 14 requests credit authorization for the usage from an online charging function (OCF), based on sending a credit control request (CCR) to the OCF 16. Based on a credit authorization decision made by the OCF 16 in view of subscriber account information and the requested usage, the OCF 16 returns a credit control answer (CCA) to the CTF 14. The CCA indicates, for example, one or more usage units that provide for a certain amount or extent of usage of the communication service by the user in the CTF 14 allows for a corresponding usage of the communication service by the user. Additional or continued use of the communication service beyond the extent or amount provided for in the CCA requires further CCR/CCA signaling between the CTF 14 and the OCF 16, which prompts further associated signaling within the communication network with respect to the involved user account.

SUMMARY

A charging trigger function (CTF) in a communication network advantageously uses pre-allocated usage units to authorize the use of a communication service by a user, when a pre-allocated usage unit is available with respect to the involved communication service and user. A pre-allocation function (PAF) provides the one or more pre-allocated usage units directly to the CTF or indirectly via an online charging function (OCF). The pre-allocated usage units are determined, for example, according to predicted usage information, user account information, and configured rules. A usage prediction function (UPF) in the network uses user-related information, such as historical usage data or other activity by the user, to generate the predicted usage information. Among its other advantages, authorizing the use of the communication service based on pre-allocated usage units obviates or reduces the need for usage authorization signaling going between the CTF and the OCF.

An example method of operation by a node operative as a CTF in a communication network includes receiving a service request for a user to use a communication service for which online charging is used and determining whether a pre-allocated usage unit is available for granting use of the communication service by the user. Responsive to a positive determination, the method includes granting use of the communication service by the user, based on the pre-allocated usage unit. Responsive to a negative determination, the method includes requesting grant of a usage unit by a node operative as an OCF, for the use of the communication service by the user and granting use of the communication service by the user, based on the requested usage unit being granted by the OCF.

An example node configured for operation as a CTF in a communication network comprises communication circuitry configured to communicatively couple the node to one or more other nodes associated with online charging and processing circuitry that is operatively associated with the communication circuitry. The processing circuitry is configured to receive a service request for a user to use a communication service for which online charging is used and determine whether a pre-allocated usage unit is available for granting use of the communication service by the user. Responsive to a positive determination, the processing circuitry is configured to grant use of the communication service by the user, based on the pre-allocated usage unit. Responsive to a negative determination, the processing circuitry is configured to request a grant of a usage unit by a node operative as an OCF, for the use of the communication service by the user, and grant use of the communication service by the user, based on the requested usage unit being granted by the OCF.

An example method of operation by a node configured as a PAF in a communication network includes obtaining predicted usage information for a user with respect to a communication service provided via the communication network. The example method further includes evaluating the predicted usage information in combination with account information associated with the user and configured business rules, and pre-allocating a usage unit for future use of the communication service by the user, in dependence on the evaluation. The pre-allocated usage unit covers a metered amount of usage of the communication service by the user.

An example node configured for operation as a PAF in a communication network comprises communication circuitry configured to communicatively couple the node to one or more other nodes in the communication network, and processing circuitry that is operatively associated with the communication circuitry. The processing circuitry is configured to obtain predicted usage information for a user with respect to a communication service provided via the communication network, evaluate the predicted usage information in combination with account information associated with the user and configured business rules, and pre-allocate a usage unit for a future use of the communication service by the user, in dependence on the evaluation. The preallocated usage unit covers a metered amount of usage of the communication service by the user.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 2 is a block diagram of one embodiment of a communication network that is configured generating and using pre-allocated usage units, for authorizing the use of one or more communication services subject to online charging.

FIG. 5 is a block diagram of example embodiments of nodes configured for operation in a communication network, for implementation of the various functions introduced in FIGS. 3 and 4.

FIG. 6 is a logic flow diagram of an example embodiment of a method of processing implemented at a node configured for operation as a charging trigger function (CTF) in a communication network.

FIG. 7 is a logic flow diagram of an example embodiment of a method of processing implemented at a node configured as a pre-allocation function (PAF) in a communication network.

FIGS. 10 and 11 are diagrams of example embodiments of data structures representing attribute-value pairs (AVPs) used for the pre-allocation of usage units in a communication network and corresponding usage reporting.

DETAILED DESCRIPTION

Figure 1:
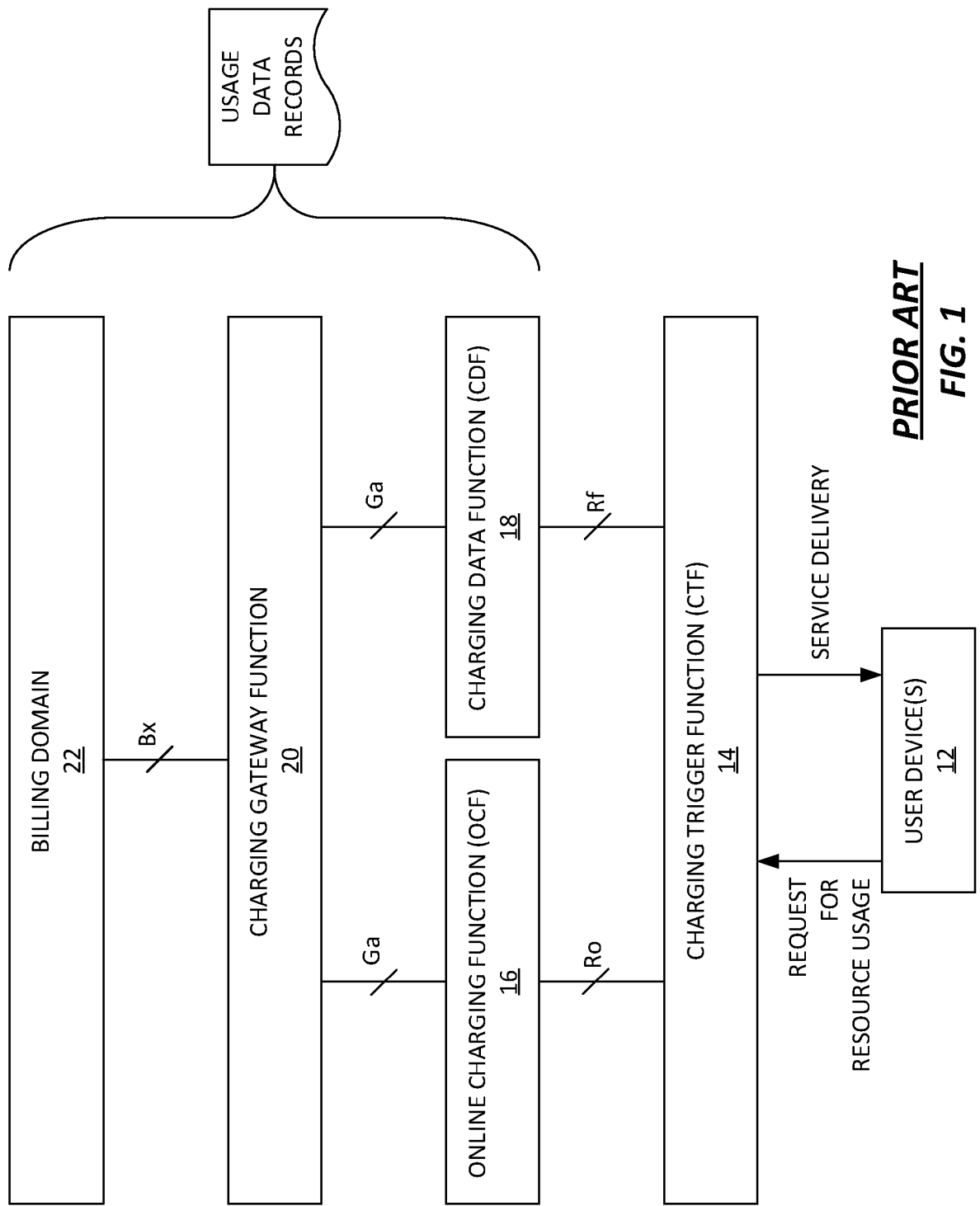
FIG. 1 is a block diagram of a known arrangement for online charging, for the use of a communication service provided through a communication network.

FIG. 2 is a block diagram of an example embodiment of a communication network 30 that offers one or more communication services to a user device 32 that are subject to online charging. Example services include any one or more of voice calls and data services, such as email, multimedia content consumption, web browsing, etc. To that end, the communication network communicatively couples the user device 32 to other devices within the network 30 and/or accessible in one or more external networks 34, such as the Internet.

The user device is any type of wireless communication apparatus that is configured for accessing the network 30 and using one or more communication provided via the network 30. In Third Generation Partnership (3GPP) parlance, the user device 32 may be referred to as a "User Equipment" or UE. Other familiar but nonlimiting examples include various kinds of mobile broadband devices, such as tablets or smartphones, laptops or other computer equipment, or network adapters configured to interface with the network 30. In an example case, the user device 32 is associated with a subscriber account and associated credentialing, for identifying and authenticating the user device 32 with respect to accessing the network 30, and for authorizing communication service usage that is subject to online charging. Correspondingly, for convenience, the user device 32 may be referred to simply as a "user" of the network 30.

The communication network 30—"network 30"—in one or more embodiments comprises a wireless communication network, such as a Long Term Evolution (LTE) network, a Fifth Generation (5G) network, or other communication network configured according to 3GPP technical specifications. As such, the network 30 includes a Radio Access Network (RAN) 36 that provides an air interface for communicatively connecting the user device 32 to the network 30. A Core Network (CN) 38 includes packet gateways or other nodes for routing packets or other data between the network 30 and the one or more external networks 34.

Of particular interest herein, the network 30 includes a number of functional elements—"functions"—configured to generate or use pre-allocated usage units, for authorizing the use of a communication service that is available to a user device 32 via the network 30 and is subject to online charging by the network 30. Example functions depicted in FIG. 2 include a CTF 40, a PAF 42, and an OCF 44. "CTF" denotes a charging trigger function, "PAF" denotes a pre-allocation function, and "OCF" denotes an online charging function. The respective functions may be implemented in nodes—e.g., computer servers or systems—within the network, and one or more of the functions may be implemented on the same computing platform or co-located computing platforms. Virtualization also may be used in the implementation of one or more of the functions, i.e., where the computing resources used to implement the function are virtual resources, e.g., at a "cloud" computing facility. By way of example, in at least one embodiment one or both of the PAF 42 and the OCS 44 are implemented using virtualized resources at a cloud computing facility.

Figure 3:
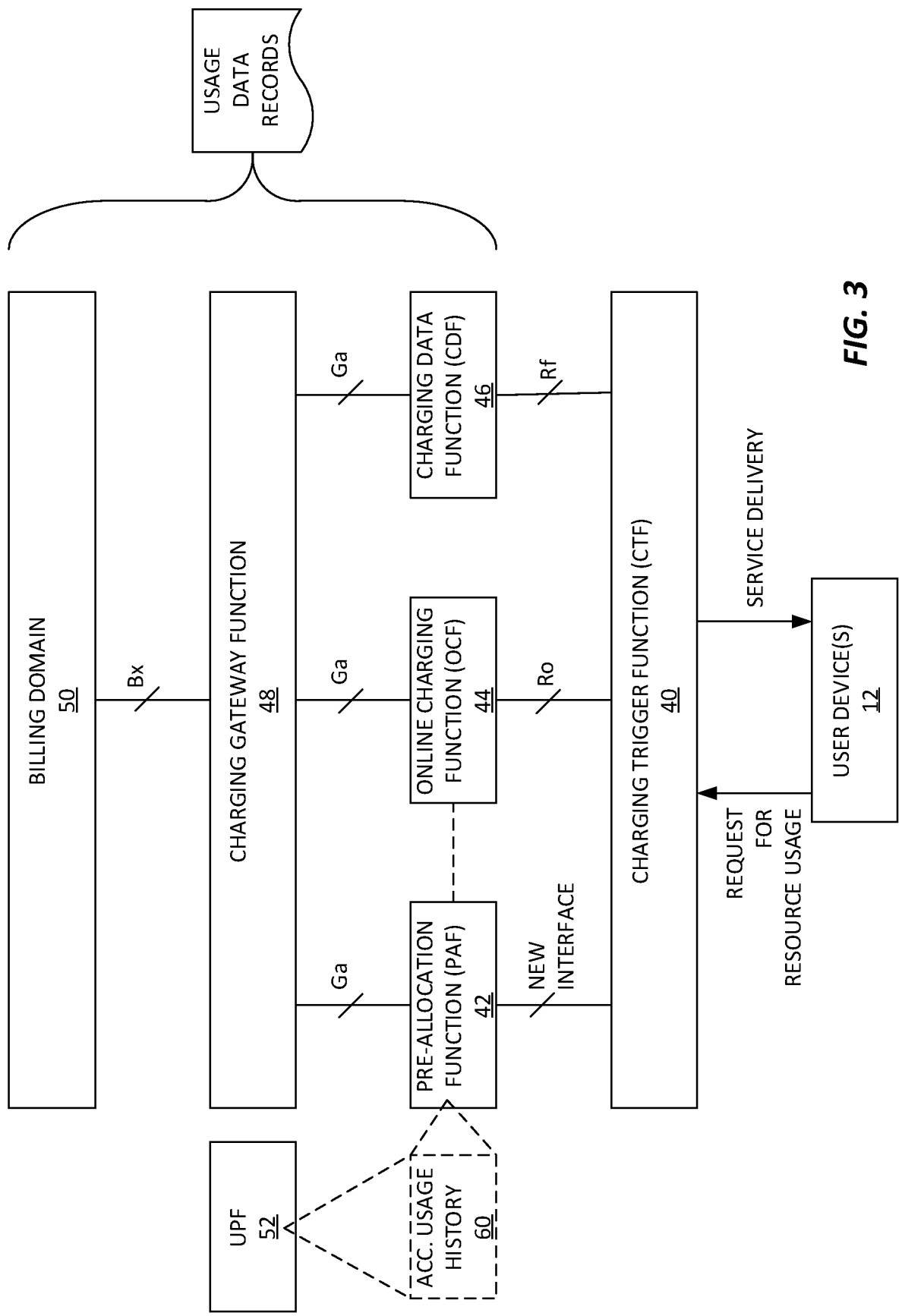
FIGS. 3 and 4 are block diagrams of example embodiments of various functions associated with the use of pre-allocated usage units in a communication network, such as the one depicted in FIG. 2.

Regardless of the implementation locations and details, FIG. 3 illustrates example operational relationships for the respective functions, in one or more embodiments. The CTF 40, which may be one of multiple CTFs 40 implemented in the network 30, receives a request for resource usage from or on behalf of the user device 12—a "user"—indicating a request to use or continue using a communication service that is associated with online charging in the network 30. The CTF 40 may have standardized interfaces with the OCS 44 and with a Charging Data Function (CDF) 46 which in turn, interface with a Charging Gateway Function 48 that interfaces with a billing domain 50. See 3GPP TS 32.225 and TS 32.229, along with IETF RFCs 3588, 4960, and 793, for information regarding standardized charging interfaces used in the "Diameter protocol".

The CTF 40 in one or more embodiments has a "new" or additional interface to the PAF 42 that is used to provide pre-allocation information to the CTF 40. The PAF 42 may interface with, or may be co-located with, a Usage Prediction Function (UPF) 52 that accumulates or organizes usage history 60 and, in one or more embodiments, other relevant user information, that provides a basis for predicting the usage of a communication service by a user. In a "normal" signaling flow involving a request for resource usage associated with a communication service that is subject to online charging, the CTF 40 sends a Credit Control Request (CCR) or other usage authorization request to the OCF 44 and receives a Credit Control Answer (CCA) or other usage authorization response in return. If the return response authorizes usage of the communication service, the CTF 40 allows an amount or extent of usage "covered" by the authorization returned from the OCF 44.

In an innovative modification to the above "standard" approach, the PAF 42 pre-allocates one or more usage units for a particular user, based on predicted usage information for one or more communication services. The CTF 40 may then authorize usage of the communication service by the particular user, based on the availability of one or pre-allocated usage units. To the extent that usage of the communication service by the user exceeds that which is covered by the one or more available pre-allocated usage units, the CTF 40 reverts to normal usage authorization request signaling. However, to the extent that one or more pre-allocated usage units are available for authorizing the requested use of the communication service, which may be an initial usage or a continued usage, the CTF 40 uses the one or more pre-allocated usage units to authorize the requested use and thereby avoids or reduces the need for usage authorization signaling going between the CTF 40 and the OCF 44.

Figure 4:
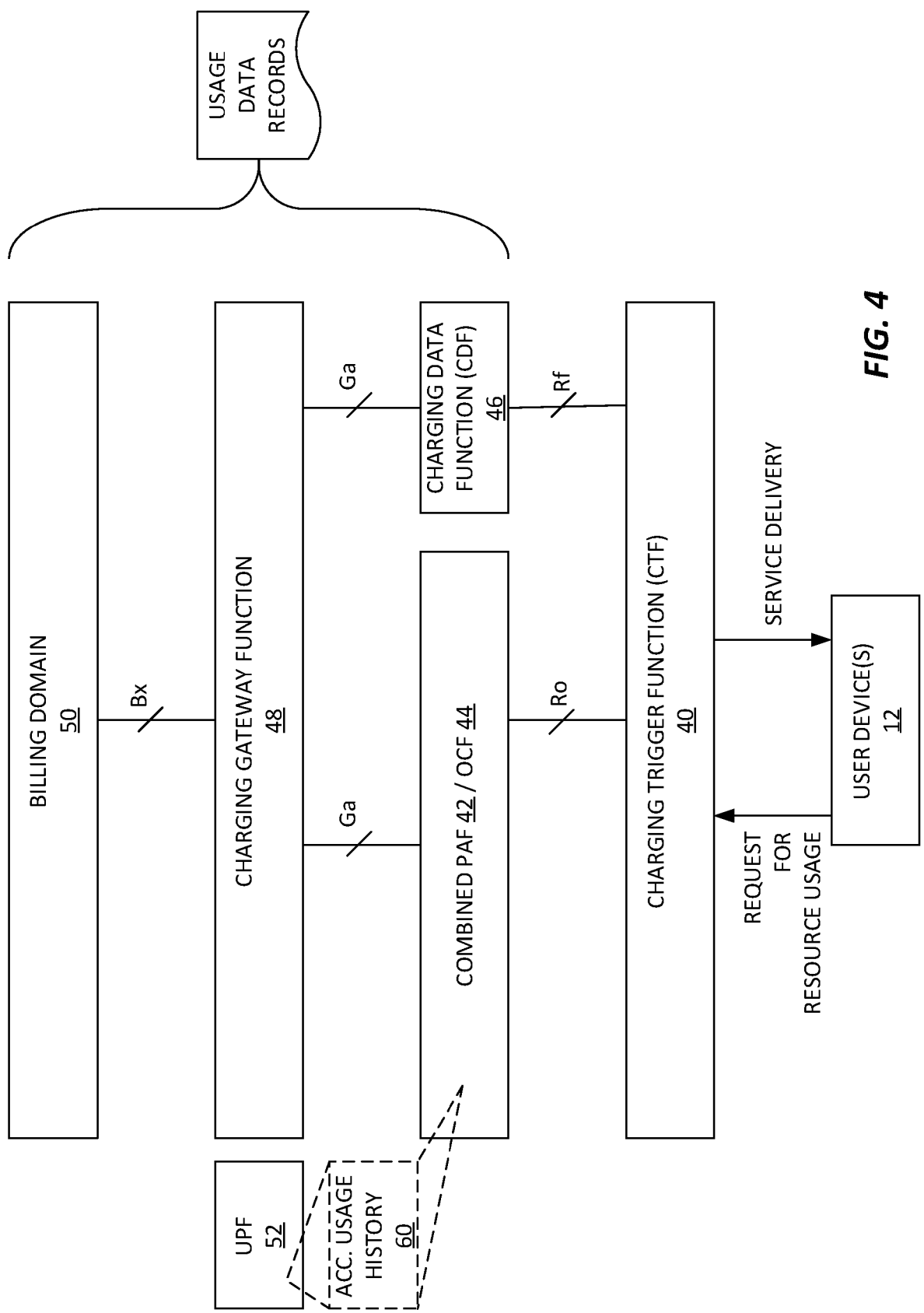

FIG. 4 illustrates another embodiment that offers similar advantages, in addition to obviating the need for a new or additional interface between the CTF 40 and the PAF 42. In the illustrated embodiment, the PAF 42 and the OCF 44 are "combined", and the pre-allocation signaling flows over the normal or standard interface defined between the OCF 44 and the CTF 40. For example, available Information Elements (IEs) in one or more message fields carry pre-allocation information, in messaging between the OCF 44 in the CTF 40, or the defined protocol may be extended explicitly to include pre-allocation signaling.

FIG. 5 provides non-limiting example illustrations of network nodes 70, 72, 74, and 76, which may be configured for operation as various ones of the functions discussed above. In the diagram, for example, the node 70 is operative as a CTF 40, the node 72 is operative as a PAF 42, the node 74 is operative as a UPF 52, and the node 76 is operative as an OCF 44. As before, one or more of the nodes may be configured to implement more than one of the illustrated functions and/or one or more of the nodes may be co-located or otherwise integrated together, to simplify the signaling interfaces therebetween. For example, the PAF 42 may be co-located with the OCF 42, as seen in FIG. 4.

Even in instances where the processing functions that collectively implement the CTF functionality are virtualized, the virtualized processing and memory circuitry ultimately relies on underlying physical circuitry. As such, the example node 70 includes communication circuitry 80, processing circuitry 82, and storage 84. The communication circuitry 80 comprises, for example, physical-layer interface circuitry and associated protocol processors. In a non-limiting example, the communication circuitry 80 comprises an Ethernet or another computer-network interface. Of course, the communication circuitry 80 may implement more than one type of interface and may support multiple communication protocols.

The processing circuitry 82 is operatively associated with the communication circuitry 80, meaning that it may send and receive messages or another signaling via the communication circuitry 80. The processing circuitry 82 comprises dedicated circuitry or programmatically-configured circuitry, or some mix of dedicated and programmatically-configured circuitry. To the extent that the processing circuitry 82 relies on general-purpose microprocessors or other general-purpose digital-processing circuitry, such general-purpose circuitry shall be understood as being specially adapted to carry out the corresponding processing described herein.

The storage 84 comprises one or more types of computer-readable media, and may include a mix of volatile storage, such as working memory for program execution, and non-volatile storage, for storing one or more computer programs 86 and one or more items of configuration data 88, which may include any one or more of provisioned figuration data items or dynamically determined configuration data items. Non-limiting examples of the storage 84 include any one or more of DRAM, SRAM, FLASH, and EEPROM, Solid State Disk (SSD), and magnetic hard drive. In at least one embodiment, the processing circuitry 82 comprises one or more microprocessors, microcontrollers, digital signal processors, FPGAs, ASICs, or other processing circuitry that is at least in part specially adapted according to the teachings herein based on the execution of computer program instructions comprised in one or more computer programs 86 stored in the storage 84.

With the above example implementation details in mind, an example node 70 is configured for operation as a CTF 40 in a communication network 30, and it comprises communication circuitry 80 that is configured to communicatively couple the node 70 to one or more other nodes 72, 76 associated with online charging. The node 70 further comprises processing circuitry 82 that is operatively associated with the communication circuitry 80.

The processing circuitry 82 is configured to receive a service request for a user to use a communication service for which online charging is used and determine whether a pre-allocated usage unit is available for granting use of the communication service by the user. Responsive to a positive determination, the processing circuitry 82 is configured to grant use of the communication service by the user, based on the pre-allocated usage unit. Responsive to a negative determination, the processing circuitry 82 is configured to request grant of a usage unit by a node 76 operative as an OCF 44, for use of the communication service by the user, and grant use of the communication service by the user, based on the requested usage unit being granted by the OCF 44.

In conjunction with the positive determination, the processing circuitry 82 in one or more embodiments is configured to grant further use of the communication service by the user beyond a metered amount of use covered by the pre-allocated usage unit, based on a further pre-allocated usage unit being available for granting use of the communication service by the user. When no further pre-allocated usage units are available for granting the further use, the processing circuitry 82 in the same or one or more further embodiments is configured to request grant of a further usage unit by the OCF 44 and grant the further use in response to the further requested usage unit being granted by the OCF 44.

Further, in at least one embodiment, in conjunction with the positive determination, the processing circuitry 82 is configured to accumulate usage information regarding use of the communication service based on the pre-allocated usage unit, and any further pre-allocated or requested usage units, and report the usage information to a node 72 operative as a pre-allocation function 42 responsible for pre-allocating usage units for the communication service.

In the above embodiment(s), the processing circuitry 82 is configured to grant use of the communication service by the user, based on the pre-allocated usage unit, by granting an amount of usage corresponding to a metered amount of usage covered by the pre-allocated usage unit. Further, the processing circuitry 82 is configured to determine whether a pre-allocated usage unit is available for granting use of the communication service by the user based on pre-allocation information stored in the charging trigger function 40.

The processing circuitry 82 is configured to determine whether a pre-allocated usage unit is available for granting use of the communication service by the user based on receiving pre-allocation information from a node 76 operative as an OCF 44 in the communication network 30, or from a node 72 operative as a PAF 42 in the communication network 30. In this context, the PAF 42 is responsible for pre-allocating usage units for the communication service.

FIG. 6 illustrates a method 600 of operation by a node 70 configured as a CTF 40 in a communication network 30. For example, the node 70 implements the method 600, based at least in part on the execution of computer program instructions stored in the node 70 by one or more microprocessors or other program-execution circuitry comprising the processing circuitry 82. Further, it will be understood that one or more "steps" or operations illustrated in the method 600 may be carried out in an order other than the one suggested by the example logic flow, and that such processing may be repeated or duplicated—e.g., carried out in parallel—for any number of users and involved communication services.

The example method 600 includes receiving (Block 602) a service request for a user to use a communication service for which online charging is used and determining (Block 604) whether a pre-allocated usage unit is available for granting use of the communication service by the user. Responsive to a positive determination (Block 606), the method 600 includes granting use of the communication service by the user, based on the pre-allocated usage unit. Responsive to a negative determination (Block 608), the method 600 includes requesting grant of a usage unit by a node 76 operative as an OCF 44, for the use of the communication service by the user and granting use of the communication service by the user, based on the requested usage unit being granted by the OCF 44.

In conjunction with the positive determination, the method 600 in one or more embodiments includes granting further use of the communication service by the user beyond a metered amount of use covered by the pre-allocated usage unit, based on a further pre-allocated usage unit being available for granting use of the communication service by the user. When no further pre-allocated usage units are available for granting the further use, the method 600 in one or more embodiments includes requesting a grant of a further usage unit by the OCF 44 and granting the further use in response to the further requested usage unit being granted by the OCF 44.

In conjunction with the positive determination, the method 600 in one or more embodiments includes accumulating usage information regarding use of the communication service based on the pre-allocated usage unit, and any further pre-allocated or requested usage units, and reporting the usage information to a node 42 operative as a PAF 42 responsible for pre-allocating usage units for the communication service.

In the method 600, granting use of the communication service by the user, based on the pre-allocated usage unit, comprises granting an amount of usage corresponding to a metered amount of usage covered by the pre-allocated usage unit. Further, in one or more embodiments of the method 600, determining whether a pre-allocated usage unit is available for granting use of the communication service by the user comprises performing the determination based on pre-allocation information stored in the CTF 40. In an example of determining whether a pre-allocated usage unit is available for granting use of the communication service by the user, the CTF 40 receives pre-allocation information from a node 76 operative as an OCF 44 in the communication network 30, or from a node 72 operative as a PAF 42 in the communication network 30. In this context, the PAF 42 being responsible for pre-allocating usage units for the communication service.

Turning back to FIG. 5, the example node 72 includes communication circuitry 90, processing circuitry 92, and storage 94. The communication circuitry 90 comprises, for example, physical-layer interface circuitry and associated protocol processors. In a non-limiting example, the communication circuitry 90 comprises an Ethernet or another computer-network interface. Of course, the communication circuitry 90 may implement more than one type of interface and may support multiple communication protocols.

The processing circuitry 92 is operatively associated with the communication circuitry 90, meaning that it may send and receive messages or another signaling via the communication circuitry 90. The processing circuitry 92 comprises dedicated circuitry or programmatically-configured circuitry, or some mix of dedicated and programmatically-configured circuitry. To the extent that the processing circuitry 92 relies on general-purpose microprocessors or other general-purpose digital-processing circuitry, such general-purpose circuitry shall be understood as being specially adapted to carry out the corresponding processing described herein.

The storage 94 comprises one or more types of computer-readable media, and may include a mix of volatile storage, such as working memory for program execution, and non-volatile storage, for storing one or more computer programs 96 and one or more items of configuration data 98, which may include any one or more of provisioned figuration data items or dynamically determined configuration data items. Non-limiting examples of the storage 94 include any one or more of DRAM, SRAM, FLASH, and EEPROM, Solid State Disk (SSD), and magnetic hard drive. In at least one embodiment, the processing circuitry 92 comprises one or more microprocessors, microcontrollers, digital signal processors, FPGAs, ASICs, or other processing circuitry that is at least in part specially adapted according to the teachings herein based on the execution of computer program instructions comprised in one or more computer programs 96 stored in the storage 94.

With the above example implementation details in mind, an example node 72 is configured for operation as a PAF 42 in a communication network 30, and it comprises communication circuitry 90 that is configured to communicatively couple the node 72 to one or more other nodes 70, 74, 76 associated with online charging. The node 72 further comprises processing circuitry 92 that is operatively associated with the communication circuitry 90.

The processing circuitry 92 obtain predicted usage information for a user with respect to a communication service provided via the communication network 30, evaluate the predicted usage information in combination with account information associated with the user and configured business rules, and pre-allocate a usage unit for a future use of the communication service by the user, in dependence on the evaluation. The pre-allocated usage unit covers a metered amount of usage of the communication service by the user.

In one or more embodiments, the processing circuitry 92 is configured to pre-allocate the usage unit by indicating the pre-allocation to at least one of a node 76 operative as an OCF 44 in the communication network 30, and a node 70 operative as a CTF 40 in the communication network 30. For example, in one or more embodiments, the communication circuitry 90 communicatively couples the node 72 to a node 70 operative as a CTF 40, for exchanging pre-allocation signaling directly with the CTF 40. In one or more other embodiments, the communication circuitry 90 communicatively couples the node 72 to a node 76 that is operative as an OCF 44, such that pre-allocation information flows from the PAF 42 to the CTF 40 indirectly, via the OCF 44.

In one or more embodiments, the configured business rules identify one or more communication services, or types of communication services, that are eligible for pre-allocation. Further, in one or more embodiments, the account information associated with the user includes an account status indicating whether the user is eligible for pre-allocation. The account information comprises, for example, information stored in or linked to a "subscriber account" that is associated with the use of the communication network 30 by the user. In one example, the account information is tied to an IMSI or another unique identifier associated with the involved user device 12—i.e., the user device 12 is used to access the network 30 and request usage of the involved communication service.

The processing circuitry 92 in one or more embodiments is configured to evaluate the predicted usage information as a learned pattern of usage by the user for the communication service. Correspondingly, the processing circuitry 92 is configured to predict future use of the communication service based on the learned pattern of usage. Thus, in one or more embodiments the processing circuitry 92 "obtains" the predicted usage information for the user based on generating the prediction, e.g., from accumulated usage history 60 pertinent to the involved user. Such embodiments may be regarded as the PAF 42 including or implementing the UPF 52. In other embodiments, the UPF 52 may be implemented separately from the PAF 42 and may generate the predicted usage information. In such cases, the processing circuitry 92 "obtains" the predicted usage information by receiving it from the UPF 52.

Usage prediction may consider any one or more of other relevant information sources or types, such as recent dispute settlements, social activity and social presence associated with the user, agreements or subscriptions between the user and one or more third parties, a credit score or other financial rating associated with the user, a known or estimated financial or economic standing of the user, where such data may be fetched from one or more sources external to the network 30. Broadly, all such data may be considered "historical data" included in or used to generate the accumulated usage history 60 for the user.

Financial standing, credit scores, or other economic information may be used, for example, to determine whether or to what extent pre-allocation should be used for a particular user. Such decisions may be made on a per communication service or per communication-service type, for the involved user. Past usage or usage patterns associated with the communication service or similar types of communication service may be used to predict or otherwise control the amount or extent of pre-allocation performed for the user, e.g., to control the number of pre-allocation usage units generated or accumulated at any one time for the user, with respect to one or more particular communication services. Similarly, the level or type of social activity by the user may be used as an input to the usage prediction function.

In an example implementation, the predicted usage information is extrapolated from historical usage information accumulated for the user with respect to the communication service. Further, in one or more embodiments, the processing circuitry 92 is configured to make the pre-allocation at a controlled time in advance of a predicted time of the predicted future use. In the same or another embodiment, the processing circuitry 92 is configured to set a validity duration for the pre-allocation based on a predicted time of the predicted future use.

As noted above, in one or more embodiments, the processing circuitry 92 is configured to obtain the predicted usage information by deriving the predicted usage information from historical usage information or by accessing the predicted usage information from a node 74 operative as a usage prediction function UPF 52 that generates the predicted usage information from the historical usage information, the historical usage information being accumulated for the user, for two or more communication services for which pre-allocation is permitted, and wherein the processing circuitry (92) is configured to pre-allocate the usage unit by pre-allocating one or more usage units for use by the user, for the two or more communication services.

At least when usage of the two or more communication services is metered in the same way, the one or more pre-allocated usage units, in an example embodiment, are fungible as between the two or more communication services. Conversely, at least when usage of the two or more communication services is not metered in the same way, the one or more pre-allocated usage units include at least one usage unit pre-allocated for a first one of the two or more communication services, and at least one usage unit pre-allocated for a second one of the two or more communication services.

In at least one embodiment, the processing circuitry 92 is configured to evaluate the predicated usage information by extrapolating future uses of the communication service based on learned patterns of usage of the communication service by the user, as learned from historical usage information accumulated for the user. Correspondingly, the processing circuitry 92 is configured to pre-allocate the usage unit for the future use by making pre-allocations of one or more usage units in amounts and at times corresponding to the extrapolated future uses.

FIG. 7 illustrates a method 700 of operation by a node 72 configured as a PAF 42 in a communication network 30. For example, the node 72 implements the method 700, based at least in part on the execution of computer program instructions stored in the node 72 by one or more microprocessors or other program-execution circuitry comprising the processing circuitry 92. Further, it will be understood that one or more "steps" or operations illustrated in the method 700 may be carried out in an order other than the one suggested by the example logic flow, and that such processing may be repeated or duplicated—e.g., carried out in parallel—for any number of users and involved communication services.

The example method 700 includes obtaining (Block 702) predicted usage information for a user with respect to a communication service provided via the communication network 30, evaluating (Block 704) the predicted usage information in combination with account information associated with the user and configured business rules, and pre-allocating (Block 706) a usage unit for a future use of the communication service by the user, in dependence on the evaluation. The pre-allocated usage unit covers a metered amount of usage of the communication service by the user.

In an example implementation of the method 700, pre-allocating the usage unit comprises at least one of: indicating the pre-allocation to a node 70 operative as a CTF 40 in the communication network 30, for use by the CTF 40 in authorizing a future requested use of the communication service by the user and indicating the pre-allocation to a node 76 operative as an OCF 44 in the communication network 30.

The configured business rules, for example, identify one or more communication services, or types of communication services, that are eligible for pre-allocation. The account information associated with the user includes, for example, an account status indicating whether the user is eligible for pre-allocation.

Evaluating the predicted usage information as part of the method 700 comprises, for example, evaluating a learned pattern of usage by the user for the communication service. Correspondingly, the method 700 includes predicting the future use of the communication service based on the learned pattern of usage. In at least one implementation, the method 700 further includes extrapolating the predicted usage information from historical usage information accumulated for the user with respect to the communication service.

Further, in one or more embodiments, the method 700 includes making the pre-allocation at a controlled time in advance of a predicted time of the predicted future use. Additionally, or another embodiment, the method 700 includes setting a validity duration for the pre-allocation based on a predicted time of the predicted future use.

Whether or not such additional features or details are implemented, in one or more embodiments, the predicated usage information comprises an extrapolated future use of the communication service based on learned patterns of usage of the communication service by the user. The learned patterns of usage are learned, for example, from historical usage information accumulated for the user, and pre-allocating the usage unit for the future use comprises, for example, making pre-allocations of one or more usage units in amounts and at times corresponding to the extrapolated future use.

Obtaining the predicted usage information as part of the method 700 includes deriving the predicted usage information from historical usage information or accessing the predicted usage information from a node 74 operative as a UPF 52 that generates the predicated usage information from the historical usage information. The historical usage information is accumulated for the user, for two or more communication services for which pre-allocation is permitted. Correspondingly, pre-allocating the usage unit comprises pre-allocating one or more usage units for use by the user, for the two or more communication services.

In an example implementation of the method 700, at least when usage of the two or more communication services is metered in the same way, the one or more pre-allocated usage units are fungible as between the two or more communication services. Conversely, at least when usage of the two or more communication services is not metered in the same way, the one or more pre-allocated usage units include at least one usage unit pre-allocated for a first one of the two or more communication services, and at least one usage unit pre-allocated for a second one of the two or more communication services.

With reference to FIG. 5, the example node 76 includes communication circuitry 110, processing circuitry 112, and storage 114. The communication circuitry 110 comprises, for example, physical-layer interface circuitry and associated protocol processors. In a non-limiting example, the communication circuitry 110 comprises an Ethernet or another computer-network interface. Of course, the communication circuitry 110 may implement more than one type of interface and may support multiple communication protocols, such as for communicating with the CTF 40 implemented in the node 70.

The processing circuitry 112 is operatively associated with the communication circuitry 110, meaning that it may send and receive messages or another signaling via the communication circuitry 110. The processing circuitry 112 comprises dedicated circuitry or programmatically-configured circuitry, or some mix of dedicated and programmatically-configured circuitry. To the extent that the processing circuitry 112 relies on general-purpose microprocessors or other general-purpose digital-processing circuitry, such general-purpose circuitry shall be understood as being specially adapted to carry out the corresponding processing described herein.

The storage 114 comprises one or more types of computer-readable media, and may include a mix of volatile storage, such as working memory for program execution, and non-volatile storage, for storing one or more computer programs 116 and one or more items of configuration data 118, which may include any one or more of provisioned figuration data items or dynamically determined configuration data items. Non-limiting examples of the storage 114 include any one or more of DRAM, SRAM, FLASH, and EEPROM, Solid State Disk (SSD), and magnetic hard drive. In at least one embodiment, the processing circuitry 112 comprises one or more microprocessors, microcontrollers, digital signal processors, FPGAs, ASICs, or other processing circuitry that is at least in part specially adapted according to the teachings herein based on the execution of computer program instructions comprised in one or more computer programs 116 stored in the storage 114.

Figure 8:
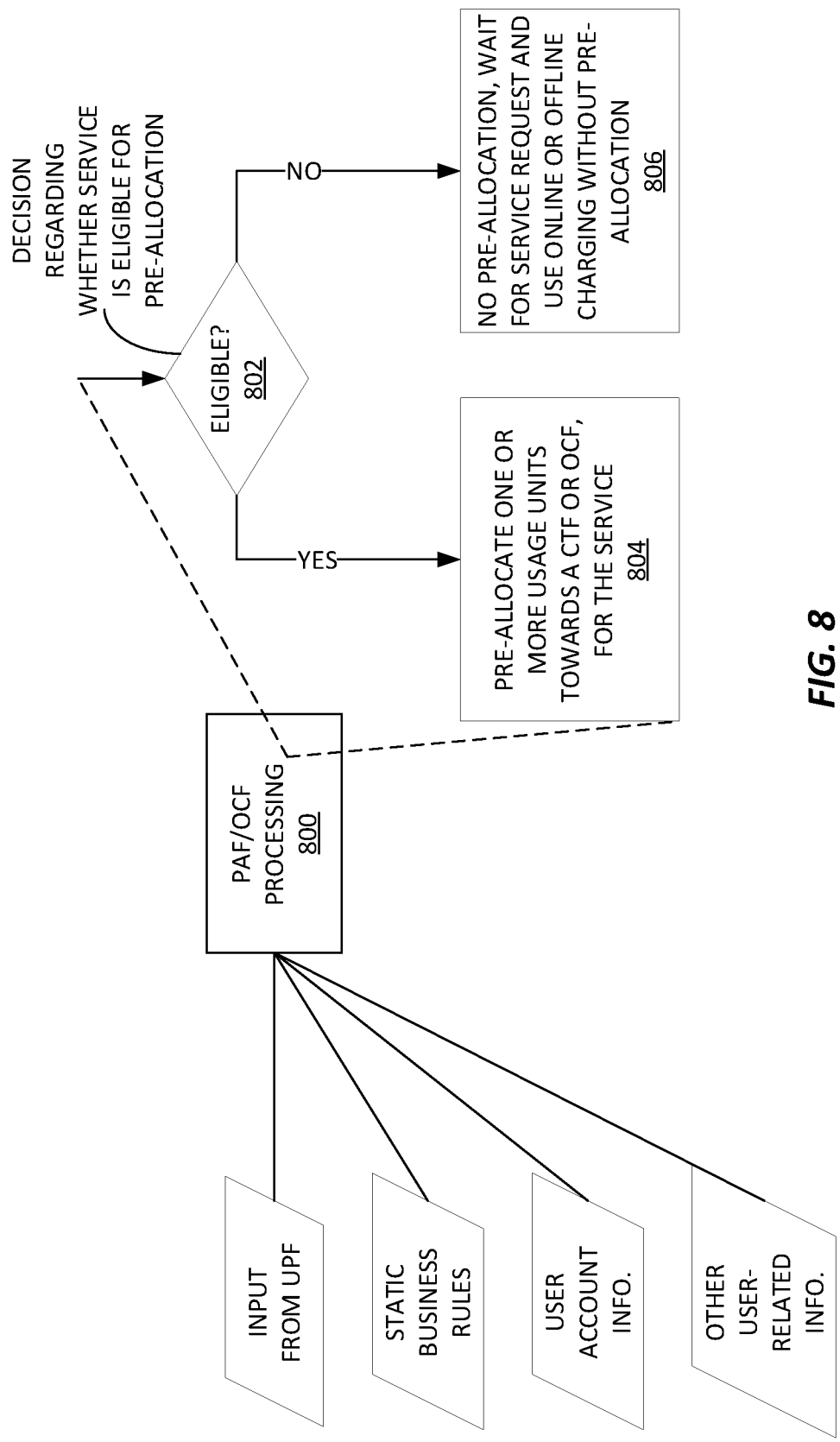
FIG. 8 is a logic flow diagram of an example embodiment of a method of processing implemented at a node or nodes that together provide a pre-allocation function (PAF) and an online charging function (OCF).

In embodiments where the OCF 44 and the PAF 42 are co-located or integrated, such functionality may be realized using separate arrangements of communication circuitry, processing circuitry, and storage. Alternatively, co-location of OCF and PAF functionality involves shared communication and/or processing circuitry, in one or more embodiments. FIG. 8 illustrates an example of pre-allocation and online charging functionality, denoted as PAF/OCF processing 800, which may be carried out as part of or in support of the method 700. The PAF/OCF processing 800 determines the services that are eligible for pre-allocation of usage units—also referred to as service units. Eligibility decisions may be based on the services themselves, irrespective of user-related considerations, or may consider the involved service or service type in conjunction with considering user-related information. As such, a given communication service may be deemed eligible for pre-allocation processing with respect to all users, with respect to one or more classes or groups of users, or with respect to individual users, on a per-user basis.

The eligibility decision and/or controlling the generation of pre-allocation usage units depends on a machine-learning based prediction function, which, for a particular user, considers one or more user-associated data items. Example items include subscriber account status, historical data, such as data indicating historical usage patterns by the user for the involved communication service, related social media/network activity, etc. Deciding whether a communication service is eligible for pre-allocation and/or controlling the generation of pre-allocation usage units for a user for a communication service may also consider static business rules, such as rate information and usage limits, such as daily or monthly limits.

FIG. 8 illustrates corresponding examples of the various types and sources of information that may feed into the PAF/OCF processing 800. For example, machine-learning based usage prediction information flows into the PAF/OCF 800 from a UPF. The example PAF/OCF processing 800 also has access to static business rules, user—subscriber—account information, and one or more other items of user-related information, such as from third-party social networking or media services. Of course, one or more of these possible sources or types of information may be omitted in a given implementation. That is, more sources/types of information may provide more accurate or sophisticated usage prediction, but the additional capabilities come at the expense of additional complexity.

If the communication service under evaluation in the PAF/OCF processing 800 is eligible for pre-allocation (YES from Block 802), processing continues with pre-allocating one or more usage units towards a CTF or OCF for the service (Block 804). The pre-allocation may be tailored to the involved user, e.g., in terms of the number of pre-allocation usage units generated and/or in the extent of usage covered by each pre-allocation usage unit. On the other hand, if the communication service under evaluation in the PAF/OCF processing 800 is ineligible for pre-allocation (NO from Block 802), processing continues with no pre-allocation (Block 806). The Block 806 processing may be understood as "normal" processing, inasmuch as it involves a CTF waiting for a service request and carrying out normal—no pre-allocation—processing for online or offline charging for the user, as applicable to the involved communication service.

As for machine-learning based processing associated with the UPF, in one or more embodiments, all usage data records and account adjustment records are gathered for each communication service used by a user and statistical data is built up for each service and calculation of the accuracy for previous predictions is done. In one or more embodiments, such processing involves time-based sorting and statistical evaluation of previous usage predictions, that were made, for ongoing improvements to the accuracy of usage predictions for the user.

As noted, subscriber usage data records, account adjustment records, and inputs from other external sources like subscriber's social network activity, credit score, etc., may be considered in predicting usage for pre-allocating usage units and/or determining eligibility for pre-allocation. Among the various data points to be considered, the UPF 52 may consider which communication services were previously used by the user, or are regularly used by the user, to assess which service or services the user is most likely to use in the near future—e.g., within the current pre-allocation interval, or in a next pre-allocation interval.

Based on such assessments, the UPF 52, which may be part of or associated with the PAF/OCF processing 800, makes a preliminary prediction of the services that the user is most likely to use in the near future, e.g., in the next hour or the next day, or other interval, and the number of usage units that would be consumed by all or a portion of the predicted usage. Based on the preliminary prediction, the PAF/OCF processing 800 extracts the information for the same services from previous predictions for the similar time period.

In one example, the usage prediction operations look at related service data historically observed for the involved user and the involved communication service, for the applicable interval, e.g., time-of-day, day-of-week, etc., and predicts usage for the current or next occurrence of the applicable interval, based on the historical usage. Further, as noted, the PAF/OCF processing 800 may include evaluating the accuracy of usage predictions and fine-tuning or otherwise adapting one or more of the parameters used for making usage predictions, to reduce the error between predicted and actual usage.

Figure 9:
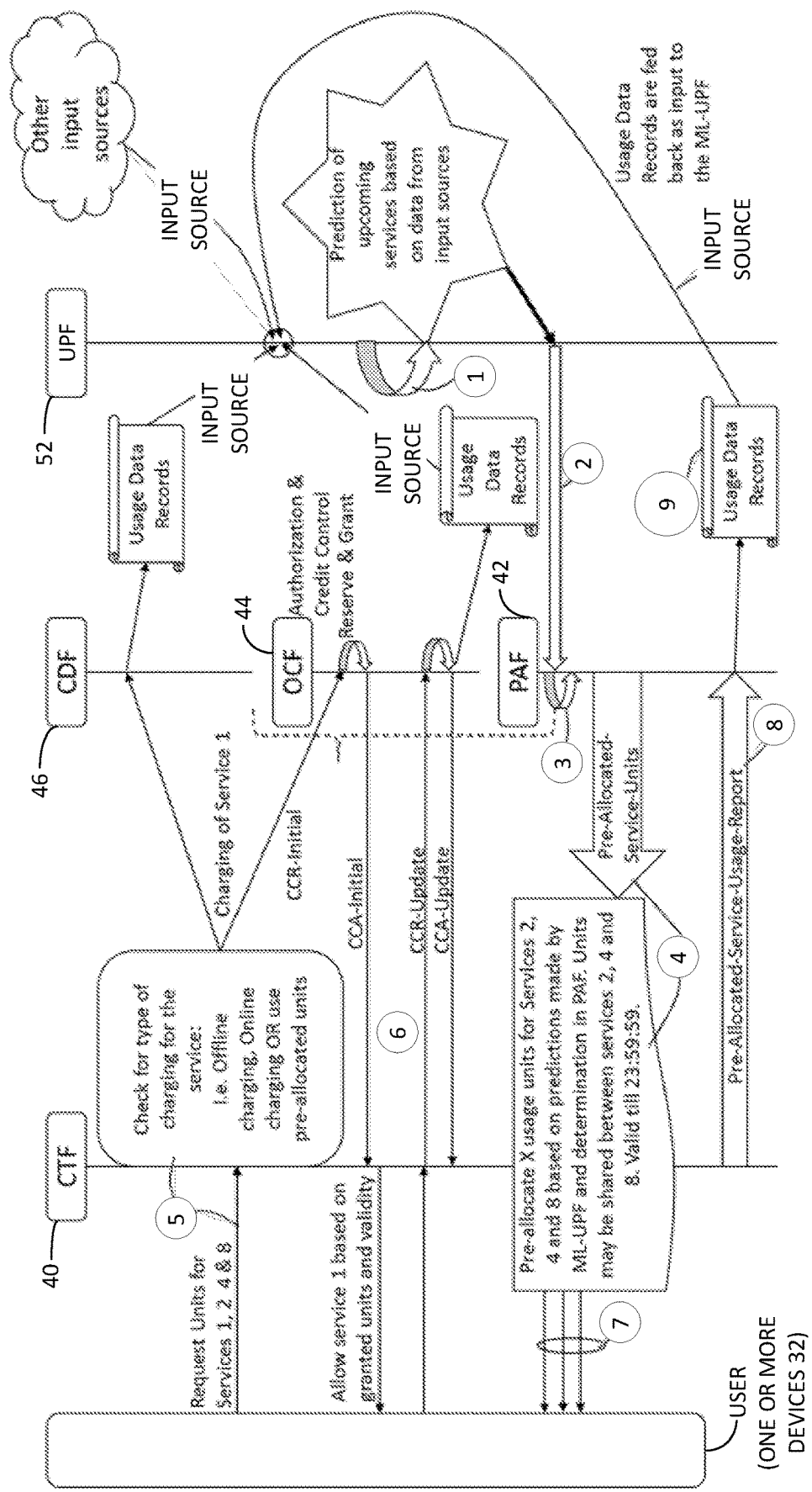
FIG. 9 is a signal flow diagram of an example embodiment of signaling and related processing at example nodes or functions associated with the generation and use of pre-allocation usage units in a communication network.

FIG. 9 illustrates an example signaling and processing flow, where pre-allocation reduces usage-authorization signaling requirements for one or more communication services. FIG. 9 presumes the involvement of a particular user. At Item 1, the UPF 52 predicts upcoming usage of one or more communication services, based on data input from one or more sources used for making usage predictions. Examples sources include usage data records reflecting past usage of one or more communication services by the involved user.

At Item 2, the UPF 52 provides the PAF 42 with usage prediction information, indicating predicted usage by the involved user of one or more communication services. At Item 3, the PAF 42 determines which communication services are eligible for pre-allocation and, at Item 4, the PAF 42 pre-allocates usage units to a CTF 40 for one or more communication services that were deemed to be eligible for pre-allocation. Different CTFs may handle different communication services, and the PAF 42 performs pre-allocations for a given service with respect to the CTF responsible for the service. FIG. 10 illustrates an example attribute-value pair (AVP) data structure, a Pre-Allocated-Service-Units AVP, that may be used for signaling pre-allocated usage units—shown as "Service Units" in FIG. 10.

At Item 5, the CTF 40 receives a request for usage units for several communication services, denoted as "Services 1, 2, 4, and 8" in the diagram, merely for labeling convenience. The CTF 40 checks the type of charging used for each of the services. In the illustrated example, the CTF 40 determines that pre-allocated usage units are available for Services 2, 4, and 8, but not for Service 1.

Thus, the CTF 40 handles usage authorization for Service 1 using "normal" processing regarding Service 1. See Item 6. That is, the CTF 40 communicates with a CDF 46 and/or an OCF 44. For example, in a case where the use of Service 1 involves online charging, the CTF 40 sends an initial CCA message to the OCF 44 and grants initial usage of Service 1 based on granted usage units and validity information returned from the OCF 44. To the extent that usage of Service 1 extends beyond the amount or extent covered by the initial authorization, the CTF 40 performs one or more CCA update procedures.

Of more interest herein, for Services 2, 4, and 8, the CTF 40 authorizes usage of the respective services using pre-allocated usage units provided directly or indirectly to the CTF 40 by the PAF 42. See Item 7 in the diagram, dealing with an example case where the pre-allocated usage units are shareable between Services 2, 4, and 8, and are subject to a validity time limit. See Item 7.

Advantageously, then, for the Services 2, 4, and 8, where pre-allocated usage units are available, the CTF 40 allows immediate use of the service, without the need for carrying out an authorization and credit-control query towards the OCF 44. In at least some instances, the immediate authorization based on pre-allocated usage units improves the user experience. More generally, the immediate authorization based on pre-allocated usage units reduces signaling overhead in the network 30 and processing overhead at the involved CTF and OCF nodes, by eliminating, at least initially, the need for authorization and credit-control signaling going between the CTF 40 and the OCF 44.

For communication service usage granted via pre-allocated usage units, the CTF 40 monitors consumption of the pre-allocated usage units and reports to PAF 42, or reports to the OCF 44, in cases where the OCF 44 integrates or is co-located with the PAF 42. See Item 8. Reported information includes, for example, the total usage per service and time-of-day when each of the services used the pre-allocated units. Reporting may be deferred until the validity time is over or when pre-allocated unit usage reaches a pre-defined threshold. FIG. 11 illustrates an example AVP data structure that may be used by the CTF 40 for reporting usage of pre-allocated usage units.

The PAF 42 generates or updates data records based on the usage reports from the CTF 40, regarding usage of pre-allocated usage units. See Item 9. These data records are fed back to the UPF 52, for further learning of the usage behavior of the user and improving future usage predictions.

In one or more implementations, the network 30 generates and uses a kind of "user profile" in online charging, where the user profile comprises or provides for predictions of communication service usage by a user of the network 30, with respect to one or more communication services or types of services that are provided to the user via the network 30. The user profile allows a PAF 42 or other node or function in the network 30 to predict what kind of communication services and/or which particular communication services the subscriber is most likely to use in the near future or in a particular interval. Example prediction intervals include time-of-day, a period of the day such as mornings or evenings, day-of-week, weekends, etc.

Based on predicted usage information, the network 30 can pre-allocate one or more usage units, to be used for at least the initial authorization of any communication service that is eligible for pre-allocation and to which the pre-allocated usage units apply. Such operations allow the network 30 to avoid, at least initially, the conventional method of "reserving and deducting" when a user begins using a communication service. "Reserving and deducting" refers to the practice of authorization usage units and making corresponding credit deductions from the subscriber account being charged for the usage.

Among other things, whether pre-allocation is permitted for a user or the extent to which pre-allocated usage units are generated for a user, for a given communication service, may depend on the "credit risk" associated with the user, which may be estimated from historical usage and account information. In addition to the aforementioned advantages of pre-allocation, pre-allocation allows for dynamic and adaptive credit pooling of available subscriber account balance and resources, personalization of quota handling for a service on an individual subscriber level, and determination of policy rules for a certain service being used by a particular user, based on usage pattern, financial standing, and credit risk profile information associated with the user.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of operation by a node configured as a pre-allocation function in a communication network, the method comprising:

obtaining predicted usage information for a user with respect to a communication service provided via the communication network;

evaluating the predicted usage information in combination with account information associated with the user and configured business rules; and pre-allocating a usage unit for a future use of the communication service by the user, in dependence on the evaluation, the pre-allocated usage unit covering a metered amount of usage of the communication service by the user;

wherein the predicted usage information is obtained by deriving the predicted usage information from historical usage information or by accessing the predicted usage information from a node operative as a usage prediction function that generates the predicted usage information from the historical usage information, the historical usage information being accumulated for the user, for two or more communication services for which pre-allocation is permitted, and wherein pre-allocating the usage unit comprises pre-allocating one or more usage units for use by the user, for the two or more communication services.

2. The method of claim 1, wherein the configured business rules identify one or more communication services, or types of communication services, that are eligible for pre-allocation, and wherein the account information associated with the user includes an account status indicating whether the user is eligible for pre-allocation.

3. The method of claim 1, wherein evaluating the predicted usage information comprises evaluating a learned pattern of usage by the user for the communication service, as learned from the historical usage information, and wherein the method includes predicting the future use of the communication service based on the learned pattern of usage.

4. The method of claim 1, wherein the predicted usage information is extrapolated from the historical usage information accumulated for the user with respect to the communication service.

5. The method of claim 1, further comprising setting a validity duration for the pre-allocation based on a predicted time of the predicted future use.

6. A node configured for operation as a pre-allocation function in a communication network, the node comprising:

communication circuitry configured to communicatively couple the node to one or more other nodes in the communication network; and processing circuitry operatively associated with the communication circuitry and configured to:

obtain predicted usage information for a user with respect to a communication service provided via the communication network;

evaluate the predicted usage information in combination with account information associated with the user and configured business rules; and pre-allocate a usage unit for a future use of the communication service by the user, in dependence on the evaluation, the pre-allocated usage unit covering a metered amount of usage of the communication service by the user;

wherein the processing circuitry is configured to obtain the predicted usage information by deriving the predicted usage information from historical usage information or by accessing the predicted usage information from a node operative as a usage prediction function that generates the predicted usage information from the historical usage information, the historical usage information being accumulated for the user, for two or more communication services for which pre-allocation is permitted, and wherein the processing circuitry is configured to pre-allocate the usage unit by pre-allocating one or more usage units for use by the user, for the two or more communication services.

7. The node of claim 6, wherein the processing circuitry is configured to pre-allocate the usage unit by indicating the pre-allocation to at least one of:
- a node operative as an online charging function in the communication network; and
- a node operative as a charging trigger function in the communication network.

8. The node of claim 6, wherein the configured business rules identify one or more communication services, or types of communication services, that are eligible for pre-allocation.

9. The node of claim 6, wherein the account information associated with the user includes an account status indicating whether the user is eligible for pre-allocation.

10. The node of claim 6, wherein the processing circuitry is configured to evaluate the predicted usage information as a learned pattern of usage by the user for the communication service, as learned from the historical usage information, and wherein the processing circuitry is configured to predict future use of the communication service based on the learned pattern of usage.

11. The node of claim 6, wherein the predicted usage information is extrapolated from the historical usage information accumulated for the user with respect to the communication service.

12. The node of claim 6, wherein the processing circuitry is configured to make the pre-allocation at a controlled time in advance of a predicted time of the predicted future use.

13. The node of claim 6, wherein the processing circuitry is configured to set a validity duration for the pre-allocation based on a predicted time of the predicted future use.

14. The node of claim 6, wherein, at least when usage of the two or more communication services is metered in the same way, the one or more pre-allocated usage units are fungible as between the two or more communication services.

15. The node of claim 6, wherein, at least when usage of the two or more communication services is not metered in the same way, the one or more pre-allocated usage units include at least one usage unit pre-allocated for a first one of the two or more communication services, and at least one usage unit pre-allocated for a second one of the two or more communication services.

16. The node of claim 6, wherein the processing circuitry is configured to evaluate the predicated usage information by extrapolating future uses of the communication service based on learned patterns of usage of the communication service by the user, as learned from the historical usage information accumulated for the user, and wherein the processing circuitry is configured to pre-allocate the usage unit for the future use by making pre-allocations of one or more usage units in amounts and at times corresponding to the extrapolated future uses.

* * * * *

UNITED STATES PATENT AND TRADEMARK OFFICE
CERTIFICATE OF CORRECTION

PATENT NO. : 11,363,149 B2
APPLICATION NO. : 17/276845
DATED : June 14, 2022
INVENTOR(S) : Jadhav et al.

It is certified that error appears in the above-identified patent and that said Letters Patent is hereby corrected as shown below:

In the Specification

In Column 3, Line 63, delete "Partnership" and insert -- Partnership Project --, therefor.

In Column 4, Line 26, delete "include" and insert -- includes --, therefor.

In Column 4, Line 38, delete "OCS 44" and insert -- OCF 44 --, therefor.

In Column 4, Lines 48-49, delete "OCS 44" and insert -- OCF 44 --, therefor.

In Column 5, Line 45, delete "OCF 42," and insert -- OCF 44, --, therefor.

In Column 13, Line 37, delete "predictions." and insert -- predictions, --, therefor.

Signed and Sealed this
Fourth Day of April, 2023

Katherine Kelly Vidal
*Director of the United States Patent and Trademark Office*